United States Patent [19]

Gant

[11] Patent Number: 4,696,319

[45] Date of Patent: Sep. 29, 1987

[54] MOISTURE-ACTUATED APPARATUS FOR CONTROLLING THE FLOW OF WATER

[76] Inventor: Martin Gant, 2 Bernarra Street, The Gap, Queensland 4061, Australia

[21] Appl. No.: 798,976

[22] Filed: Nov. 18, 1985

Related U.S. Application Data

[63] Continuation-in-part of Ser. No. 579,112, Feb. 10, 1984, abandoned.

[51] Int. Cl.⁴ .............................................. A01G 27/00
[52] U.S. Cl. ................................ 137/78.3; 200/61.04; 200/61.06; 239/63
[58] Field of Search .................... 239/63; 137/78.3; 200/61.04, 61.06; 251/137

[56] References Cited

U.S. PATENT DOCUMENTS

| | | | |
|---|---|---|---|
| 3,204,872 | 9/1965 | Whear | 137/78.3 |
| 3,562,731 | 2/1971 | Hsu | 200/61.04 |
| 3,874,590 | 4/1975 | Gibson | 239/63 |
| 3,910,300 | 10/1975 | Tal | 239/63 |

OTHER PUBLICATIONS

The American Heritage Dictionary, Houghton Mifflin Co., Boston, p. 124, 1976.

Primary Examiner—A. Michael Chambers
Attorney, Agent, or Firm—Brown, Martin Haller & Meador

[57] ABSTRACT

A moisture-actuated apparatus for controlling the flow of water by expandingly absorbing moisture from and contractingly emitting moisture into a moisture-conducting medium. The actuation is binary, with one state resulting from the expansion of an actuating element when it absorbs moisture from a water-conducting medium having a higher concentration of moisture than the element. The second state results from the contraction of the actuating element when the medium contains a lower concentration of moisture than the element, causing the element to emit moisture into the medium. The actuating element includes a thirotropic hydrophilic expandite material disposed in a matrix of wicking material. In one embodiment the absorptive expansion is used to provide a high-moisture signal in the same embodiment, contraction of the element produces a low moisture signal for opening the valve. In other embodiments, the expansion and contraction of the actuating element is used to directly actuate a valve.

21 Claims, 6 Drawing Figures 4,696,319

MOISTURE-ACTUATED APPARATUS FOR CONTROLLING THE FLOW OF WATER

This application is a continuation-in-part of U.S. patent application, Ser. No. 579,112, filed on Feb. 10, 1984, and now abandoned.

BACKGROUND OF THE INVENTION

The present invention relates generally to apparatus for controlling the flow of water, and more specifically to a moisture-actuated apparatus responsive to the moisture content of a water-conducting medium for controlling the flow of water in a system or through a device which delivers water to the medium.

As is known, it is required to deliver water to irrigation systems on demand, in response to the moisture content of a medium to be irrigated. Thus, system control is directed to operating the system to irrigate at times when, for example, the medium is relatively dry. Moreover, it is desirable to effect such control without requiring constant human supervision to make and implement the decision to irrigate. Automatic control devices are known which monitor the hydration of irrigated areas and make system control decisions based upon the electrical characteristics of soil, which change with its moisture content. However, such apparatus require the provision of electrical power to perform the monitoring as well as to operate the system. This results in an excessive requirement for electrical power. Further, constant exposure to the hydrated and chemically treated soil which is serviced by the irrigation system can corrode metallic parts which perform the electrical sensing function, thereby resulting in a reduction in the quality of system performance. Finally, the conductivity of soil changes with changing chemical content, which results in a requirement to reset an electrical sensing system whenever soil is chemically treated.

Therefore, in an irrigation system which delivers water to a medium to be irrigated, it would be desirable to provide an apparatus for controlling the flow of water to the system which is responsive to the moisture content of the medium, which is automatically actuated by the moisture content of the medium, yet which depends for its operation on the provision of no electrical power. Further advantage would attend the use of an accurate, long-lasting, troublefree actuator to perform such actuation in response to the presence of absence of water.

SUMMARY OF THE INVENTION

The present invention overcomes the limitations of existing water flow control apparatus which are actuated by electrical devices by taking advantage of the mechanical action of a hydrophilic expandite material to perform useful work. The fundamental principle of the invention is the use of a moisture driven actuator element formed from hydrophilic expandite material dispersed in a matrix of wicking material that expandingly absorbs moisture from a moisture-conducting medium such as soil when that medium contains a higher concentration of moisture than the element, and that contractingly emits water to the medium when the element has a higher concentration of moisture than the medium. The expansion of the actuator element is indicative of a rise in moisture content of the medium and is used to actuate an operation which will stop water flowing to the medium; the contraction of the element, indicative of a drop in the moisture content of the medium, is used to initiate the flow of water to the medium or directly to the medium.

Advantage is taken of the mechanical moisture response of the actuating element by connecting the element to a device for controlling the flow of water, such as a valve. Thus, when the moisture content of an irrigated medium rises, the actuating element expands and performs work which is useful to stop the flow of water. In one embodiment of the invention, expansion of the actuating element seats a valve in a valve seat; similarly, when the element contracts, in the valve embodiment the valve stem is unseated, which permits water to flow. In responding to the moisture content of the irrigated medium, the embodiments essentially respond to the demand of the medium for water, providing water when the medium demands, and shutting it off when the need is sated.

It is therefore the principal object of the present invention to provide a moisture-actuated apparatus for performing useful work in controlling the flow of water.

Another objective of the invention is to achieve useful moisture actuation through employment of an actuator element consisting of a naturally-occurring hydrophilic expandite material dispersed in a matrix of wicking material contained in a water-permeable housing.

Other objects and many attendant advantages of this invention will be more apparent upon reading the following detailed dscription and examination of the accompanying drawings.

DETAILED DESCRIPTION OF THE INVENTION

Figure 1:
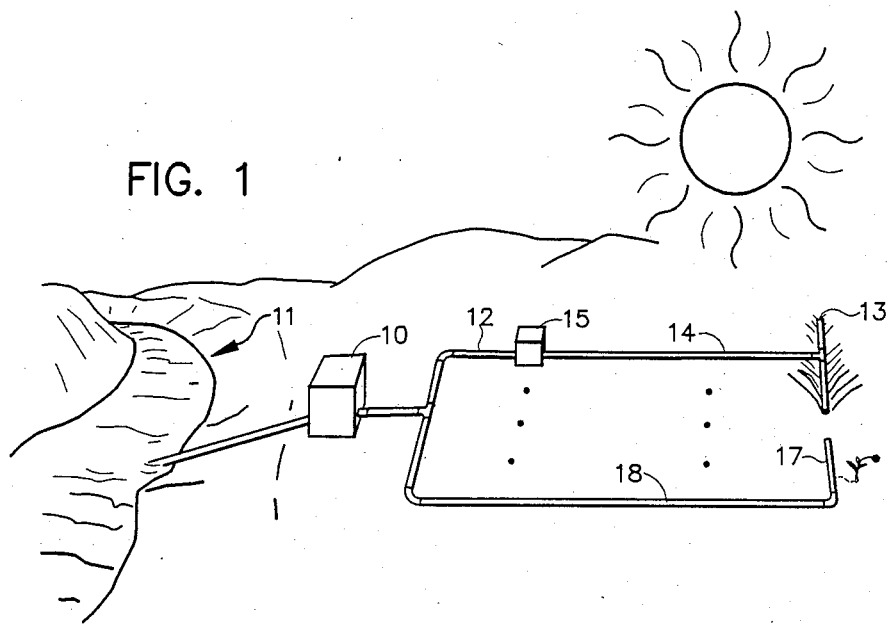
FIG. 1 is a block diagram illustrating one operational system environment in which the apparatus of the invention may be used.

With reference to FIG. 1, the operational environment of the apparatus of the present invention can be understood. In order to irrigate a water-conducting medium such as soil during the process of agricultural production, water must be periodically delivered to the medium. As is known, the water is used for a variety of purposes, among which are irrigation of crops and leeching of the soil. Irrigation systems which accomplish these purposes are large and in continuous operation. It is advantageous to make the operation of such systems as automatic as possible, in order to reduce the total amount of human labor required and thus to increase the efficiency of that labor. Moreover, water which is supplied at the demand of the irrigated medium wastes less water and increases crop yield.

A moisture-actuated system for providing delivery of water to a water-conducting agricultural medium such as soil upon the demand of the medium for water can include a source of pressurized water 10 such as a pump which draws water from, for example, an irrigation canal 11 and pumps it through a distribution manifold 12. The manifold 12 can feed a number of individual irrigation equipments, each of which delivers water to an individual section or plant of an agricultural operation.

In FIG. 1, such a piece of irrigation equipment comprises similarly, a hydrophilic actuated valve 17, which is used for delivering water to an individual plant or a localized bedding area and is fed through a connecting pipe 18 from a water-supply.

Figure 2:
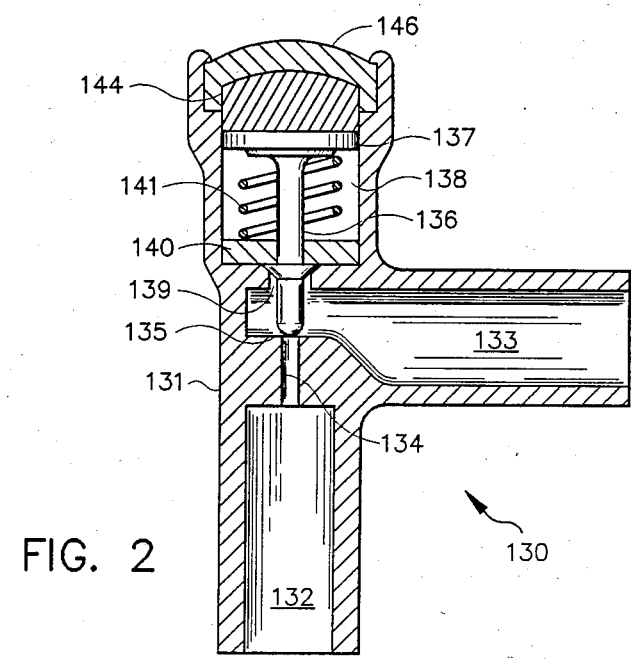
FIG. 2 is a sectional side view of a moisture-actuated valve employing a hydrophilic expandite element for operation.

FIG. 2 illustrates the structure and operation of a moisture-actuated valve using a hydrophilic expandite sensor which is desirable when, for example, only a single plant or a small area is to be irrigated. The moisture-actuated valve, indicated by 130, includes a standard right angle channel section 131 having an input port 132 and an output port 133. Preferably, the section 131 is fabricated from a non-water porous material. The connection between the ports 132 and 133 comprises a valve channel 134 which is controlled by the stem 135 of a valve rod 136 having a valve rod cap 137 which is in sliding engagement with the inner surface of a valve chamber 138. A sealed aperture 139 is centered in the bottom surface of the valve chamber 138 to enable the valve rod to move reciprocatingly toward and away from the valve channel 134. A seal (not shown) prevents water from flowing between the valve rod and the aperture 139 and therefore prevents water flowing between the port 133 and the chamber 138. A washer 140 having an aperture through which the valve rod 136 extends, provides a lateral restraining force and constrains the rod to move in the desired direction. A spring 141 is placed between the valve rod cap 137 and the washer 140. Above the valve cap 137 is a hydrophilic expandite assembly 144, and a snap-on cap 146 also made of a porous material. A plurality of capillaries may be provided through the snap-on cap 146 in order to facilitate the movement of moisture to and away from the hydrophilic expandite assembly 144.

In operation, the hydrophilic expandite assembly 144 absorbs moisture from a wet or saturated medium with which the snap-on cap 146 is in contact. As the hydrophilic expandite assembly 144 absorbs water, it swells and exerts pressure on the top of the valve rod cap 137 against the return spring 141, compressing the spring and moving the tip 135 of the valve toward the valve channel 134. At a point which is determined by the amount of material forming the hydrophilic expandite assembly 144, the moisture content of the moistened medium, the length which the tip 135 must travel, the compression force of the spring 141, and the pressure of the water in the inlet port 132, the tip 135 will be forced against the valve channel 134. This closes the channel and prevents the flow of water from the input port 132, which may be connected to a source of pressurized water, and the output port 133, which may be open to a tube that carries water to the base of a plant.

As the surrounding medium dries, the mechanism of the valve 130 acts inversely to the operation just described. As the medium dries, water is drawn from the hydrophilic expandite assembly 144 through the porous material of the snap-on cap 146 to the medium. As the water is emitted, the hydrophilic expandite assembly 144 shrinks, reducing the compressing force acting against the spring 141. This permits the compressed spring to move the valve upwardly in the valve chamber 138, which moves the tip 135 away from the valve channel 134 and permits water to flow from the input port 132 to the output port 133.

Figures 3, 4, 5:
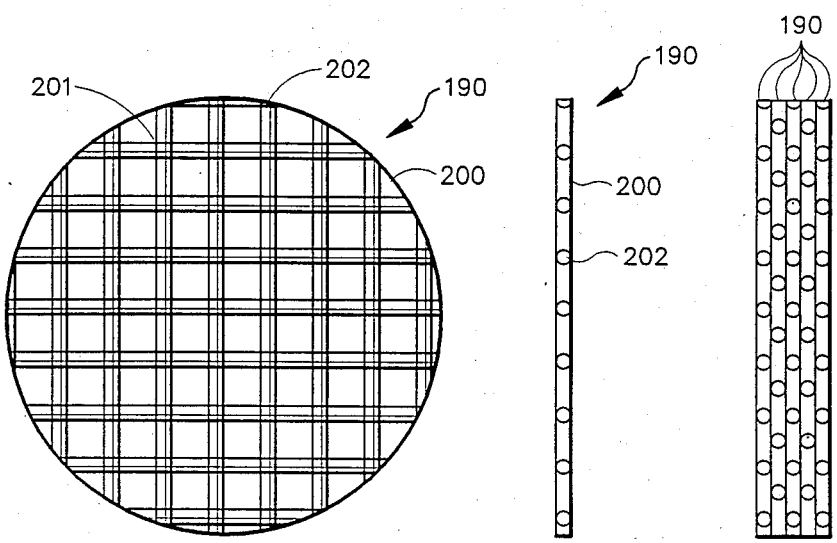
FIG. 3 is a magnified, plan view of a moisture-driven actuator element.
FIG. 4 is a side sectional view of the element of FIG. 3.
FIG. 5 shows a side sectional view of several elements of FIG. 4 in a layered configuration.

Referring now to FIGS. 3, 4, and 5, the preferred embodiment of a moisture-actuated, hydrophilic expandite element for use in a hydrophilic expandite assembly such as the assembly 144 described hereinabove is illustrated. FIG. 2 is a magnified plan view of a hydrophilic expandite element; FIG. 10 is a side view of the element; and FIG. 11 is a side view of several hydrophilic expandite elements in a stacked array. The element 190 consists of a hydrophilic expandite material 200 dispersed within the interstices of a matrix 201 of wicking material 202. As shown, the matrix 201 is a two-dimensional matrix that consists of a wicking material that extends through the element 190 and carries water to wet many surfaces. As is conventional, the wicking material consists of bundled fibers that draw moisture by capillary action. This is illustrated representationally in FIG. 9, where the matrix 201 is magnified to show the fiber strands that form the material 202.

The hydrophilic expandite material 200 is preferably bentonite which, as has long been known, has unique properties as a hydrophilic expandite. Bentonite is thixotropic, a sodium zeolite, and a very fine colloid. Because it is a very fine colloid, bentonite is quite hard when it is dry and is difficult to wet because it is so hard. In order to facilitate its wetting, a large portion of the surface area of the bentonite is brought into contact with the water by means of the wicking matrix 201. Once the bentonite is wetted, it expands and this expansion is captured to perform useful work.

Bentonite is a hydrophilically expandable, naturally-occurring mineral substance usually formed as a fine colloid of high alumnia clay, 50% of whose particles are typically less than 5 microns in diameter. In its naturally-occurring state, bentonite is typically a sheet, having a width as much as 300 times its thickness. More precisely, bentonite is a zeolite with bound surface water and bound sodium ions. Even completely dry, bentonite typically comprises about 2% by volume of water which is held by surface tension to over 600 degrees F., in a vapor pressure of over 400 psi. When brought into contact with a material having a higher concentration of moisture than it, the bentonite accepts an influx of moisture which flows between its structural plates by capillary action and moves the plates apart to expand the volume of the bentonite. As is known, the clay which forms bentonite is a very fine filter and will block colloids and some solutes. Contaminants which might be caught on the surface of the bentonite as water is absorbed into it are washed off again as the water leaves the material. Bentonite deposits occur throughout the world with the hydrophilically expandable characteristics of the material varying from deposit to deposit. However, bentonite extracted from certain deposits in Australia can swell to as much as 100 times its original volume by expansive action.

When the material with which it is placed in contact begins to dry, the absorbing action of bentonite is reversed and the absorbed moisture flows from the bentonite back into the material, the bentonite returning to its original size as the material dries sufficiently to draw out all of the moisture originally absorbed through the capillary action of the mineral. Such contraction can be mechanically aided, for example, by the compressing action of the spring 141 in FIG. 2. In use the spring only serves to lift the valve stem 136 as water pressure is not effective on such small areas as channel 134.

The moisture-conducting material of which the wicking matrix 201 in FIG. 2 is constructed effectively provides a wicking capillary action which increases the effective surface of the hydrophilic material 200 and transports the moisture between the hydrophilic material and the medium with which the hydrophilic material exchanges moisture. The wicking material can comprise, for example, felt, cotton, or polyester.

The amount of expandite material which is necessary to perform the desired actuating operation will be a matter of design choice, depending upon the moisture-exchanging characteristics of the selected hydrophilic material, the desired moisture levels at which the actuating events are to take place (for example, the maximum moisture level at which irrigation is to be initiated and the minimum moisture level at which irrigation is to be ceased), and any physical restraints upon the size of the moisture-actuated hydrophilic expandite assembly.

The element 190 is normally wicking material and bentonite, with the wicking material and bentonite evenly distributed throughout the element. The ratio of wicking material to bentonite can be varied to control the response time of the actuator element 190. Since the bentonite is thixatropic, this prevents it from penetrating to the inner fibers of the wicking material, leaving them free of the clay and permitting them to perform their water-conducting task. Further, the use of bentonite in a moisture-responsive actuating element that may be buried in the earth lengthens the useful life of the actuator. Bentonite is a sodium salt and contains, bound to the surfaces of the clay, sodium ions, which inhibits the growth of the roots of most, if not all plants. A root getting near bentonite loses moisture and nutrients to the clay and quickly dies. As is known, there are no roots in a bed of bentonite, in fact, it has been observed that roots rarely approach much closer than an inch. Thus, the presence of bentonite in moisture-actuated, hydrophilic expandite assemblies will prevent the assemblies being breached by roots.

The actuating elements of FIGS. 3 and 4 can be used to directly or indirectly actuate the valves. For example, the member 190 of FIGS. 9 and 10 is normally combined with other identically-constructed members into a stack of elements as illustrated in FIG. 5 in side sectional view. In FIG. 5 each of the vertical laminae consists of a member equivalent in all respects to the member 190 that consists of bentonite 200 finely dispersed in a two-dimensional wicking matrix 201. A stack of members such as the stack of FIG. 5 can form each of the moisture-actuated hydrophilic expandite assemblies indicated by 144 in FIG. 2. Similarly, FIG. 5 illustrates the preferred structure of the assemblies 144 and 180 of FIG. 2.

Figure 6:
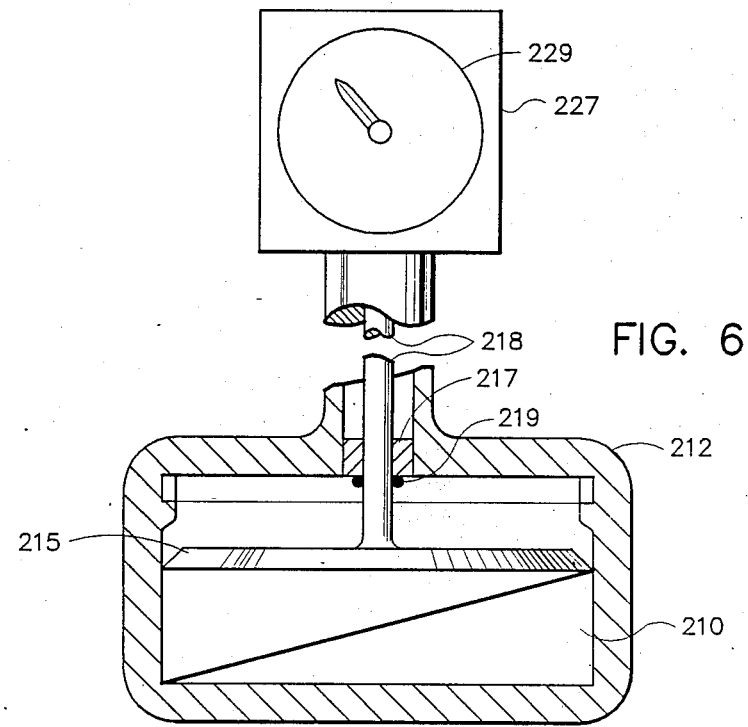
FIG. 6 shows a side sectional view of layered elements as used in combination with the mechanism of FIGS. 2.

Finally, the stacked member assembly of FIG. 5 is also useful in actuating the moisture indicator of FIG. 6. In FIG. 6 a moisture sensor comprising an assembly 210 corresponding to the stacked elements 190 of FIG. 11 is contained in a moisture-permeable housing 212 between the bottom of the housing and the face of a movable piston 215. The piston has a shaft 218 that extends through an aperture and an upper seal 217. 219 is an O-ring sealing the aperture in the seal 217. Shaft 218 is conventionally coupled to an analog indicator 227 having a face 229 calibrated to indicate the moisture content in a moisture-conducting medium that the housing 212 is disposed in.

In operation, water passes through the porous walls of the housing 212 between the medium and the moisture-actuating assembly 210. As the assembly 210 expandingly absorbs mixture, it causes the analog moisture indicator to provide a corresponding reading by virtue of the movement communicated to the indicator by the upward movement of the piston shaft 218. Similarly, as the moisture actuating assembly 210 releases moisture to the surrounding medium, the piston shaft 218 moves downwardly, causign the indicator to lower the moisture content reading.

Having described my invention, I now claim:

1. An actuating element, comprising:
   a wicking matrix lamina formed from strands of wicking material arranged to form a regular, two-dimensional matrix of recesses; and
   thixotropic, hydrophilic, mineral expandite material in said recesses for expandingly absorbing moisture from a moisture-conducting medium having a higher concentration of moisture than said material and for contractingly emitting moisture to said medium when said medium has a lower concentration of moisture than said material.

2. An actuator comprising:
   a body containing a movable member;
   a moisture-passing housing attached to said body;
   an actuator in said housing and acting against said movable member by moving said member to a first position when said actuator absorbs moisture through said housing and for moving said member to a second position when said actuator emits moisture through said housing, said actuator including a lamina of wicking fibers arranged in a regular, two-dimensional matrix defining a plurality of interstices, and a thixotropic, hydrophilic, mineral expandite disposed in said interstices.

3. A valve for controlling the delivery of water to a water-conducting medium, comprising:
   a valve body including a first port, a second port, and a channel connecting said first and second ports;
   a valve mechanism with a valve stem that penetrates into said channel, said valve mechanism being movably disposed with respect to said channel;
   a seal between said valve stem and said channel;
   a moisture-passing housing containing said valve mechanism; and
   a moisture-exchanging actuator means in said housing disposed adjacent said valve mechanism for acting upon said valve mechanism to move said valve stem into and seal said channel when said actuator means absorbs moisture and expands or to remove said valve stem from and open said channel when said actuator means emits moisture and contracts;
   said actuator means including a planar array of wicking fibers arranged to form a regular, two-dimensional matrix of spaces, and a thixotropic, hydrophilic mineral expandite disposed in said spaces.

4. The valve of claim 3 wherein said thixotropic mineral expandite comprises bentonite.

5. The valve of claim 4 wherein said bentonite and said wicking material form a single, planar actuator in which the ratio of bentonite to wicking material corresponds to a predetermined actuator means response time.

6. The valve of claim 5 including a plurality of planar actuators in a vertical stacked array, each of said planar actuators substantially conforming to said single planar actuator.

7. The valve of claim 3 wherein said housing is a closed, water-permeable housing.

8. The valve of claim 3 further including a spring means acting between said actuator means and said valve mechanism for being compressed when said actuator means expands and for expanding to remove said valve stem when said actuator means contracts.

9. A valve for controlling the delivery of water to a water-conducting medium, comprising:
a valve body;
an input port in said valve body for connecting to a source of pressurized water;
an outer port in said valve body for providing a flow of water;
a channel in said valve body connecting said input port to said output port;
a moisture-permeable housing on said valve body;
a movable valve assembly extending between said valve body and said moisture-permeable housing for moving to a first position opening said channel and for moving to a closed position closing said channel; and
actuating means in said moisture-permeable housing for moving said valve assembly to said closed position when said actuating means absorbs moisture through said housing and for moving said valve assembly to said open position when said actuating means emits moisture through said housing, said actuating means including a lamina of wicking fibers arranged in a regular, two-dimensional matrix to form a plurality of matrix interstices, and a thixotropic, hydrophilic, mineral expandite disposed in said interstices, which expandingly absorbs moisture from a medium having a higher moisture content than said expandite and which contractingly emits moisture to a medium having a lower moisture content than said expandite.

10. The valve of claim 9 wherein said moisture-permeable housing is disposed in moisture-exchanging contact with said water-conducting medium.

11. The valve of claim 10 wherein said medium comprises soil.

12. The valve of claim 11 in combination with an irrigation system having an input port connected to said apparatus output port for receiving said flow of water and a source of pressurized water connected to said apparatus input port.

13. The valve of claim 9 wherein said actuating means includes return means for moving said valve assembly to said open position when said thixotropic, hydrophilic mineral expandite emits moisture and contracts.

14. The valve of claim 13 wherein said wicking material is in the form of a wicking matrix and said thixotropic, hydrophilic mineral expandite is disposed in interstices said wicking matrix.

15. The apparatus of claim 14 wherein said thixotropic hydrophilic mineral expandite comprises hydro expandable bentonite.

16. A moisture-driven actuator for performing useful work, comprising:
a water-permeable housing;
a lamina of wicking fibers in said housing, said fibers arranged in a regular, two-dimensional matrix defining a two-dimensional array of matrix interstices;
a thixotropic hydrophilic mineral expandite disposed in said matrix interstices for expandingly absorbing moisture through said housing from a moisture-conducting medium having a higher concentration of moisture than said thixotropic, hydrophilic mineral expandite and for contractingly emitting moisture through said housing to said medium when said medium has a lower concentration of moisture than said thixotropic, hydrophilic mineral expandite;
movable means connected to said lamina of wicking fibers for being moved to a first position by said lamina of wicking fibers when said thixotropic, hydrophilic mineral expandite expands and for being moved to a second position; and
return means for moving said movable means to said second position when said thixotropic hydrophilic mineral expandite contracts.

17. The actuator of claim 16 wherein said thixotropic hydrophilic mineral expandite is disposed in a matrix of wicking material.

18. The actuator of claim 17 further including water-permeable means for housing said hydrophilic thirotropic mineral expandite.

19. The actuator of claim 18 wherein said movable means comprises a valve stem disposed adjacent a valve seat for being seated in said valve seat when said thixotropic, hydrophilic mineral expandite expands and for being unseated from said valve seat when said thixotropic, hydrophilic mineral expandite contracts.

20. The actuator of claim 17 wherein said thixotropic hydrophilic mineral expandite comprises bentonite.

21. A hydrophilic, mineral actuating element, comprising:
a laminar wicking matrix formed from strands of wicking material arranged to form a regular, two-dimensional matrix of recesses;
thixotropic, hydrophilic mineral expandite material in said recesses for expandingly absorbing moisture from a moisture-conducting medium having a higher concentration of moisture than said material and for contractingly emitting moisture to said medium when said medium has a lower concentration of moisture than said material; and
movable means in contact with said laminar wicking matrix for being moved to a first position when said material expands and moves to a second position when said material contracts.

* * * * *